US011619188B2

(12) United States Patent
Schröder et al.

(10) Patent No.: US 11,619,188 B2
(45) Date of Patent: Apr. 4, 2023

(54) METHOD FOR HEATING EXHAUST GAS PURIFICATION DEVICES, EMISSION CONTROL SYSTEM, AND MOTOR VEHICLE

(71) Applicant: Volkswagen Aktiengesellschaft, Wolfsburg (DE)

(72) Inventors: Ulrich Schröder, Braunschweig (DE); Christian Dierschke, Goslar (DE); Johannes Forst, Hannover (DE); Daniel Leineweber, Braunschweig (DE); Michael Tomforde, Gifhorn (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 29 days.

(21) Appl. No.: 16/286,069

(22) Filed: Feb. 26, 2019

(65) Prior Publication Data
US 2019/0264627 A1 Aug. 29, 2019

(30) Foreign Application Priority Data

Feb. 27, 2018 (DE) ...................... 10 2018 104 453.4

(51) Int. Cl.
*F02D 41/02* (2006.01)
*F01N 3/023* (2006.01)
(Continued)

(52) U.S. Cl.
CPC .......... *F02D 41/029* (2013.01); *F01N 3/023* (2013.01); *F01N 3/035* (2013.01); *F01N 9/00* (2013.01);
(Continued)

(58) Field of Classification Search
CPC ........ F01N 3/023; F01N 3/035; F01N 3/2006; F01N 9/00; F01N 9/002; F01N 13/009;
(Continued)

(56) References Cited

U.S. PATENT DOCUMENTS

2001/0052232 A1 12/2001 Hoffmann et al.
2004/0206070 A1 10/2004 Shirakawa
(Continued)

FOREIGN PATENT DOCUMENTS

CN 102844534 A 12/2012
CN 103261597 A 8/2013
(Continued)

OTHER PUBLICATIONS

Search report for German Patent Application No. 10 2018 104 453.4, dated Dec. 3, 2018.
(Continued)

*Primary Examiner* — Audrey B. Walter
(74) *Attorney, Agent, or Firm* — Pearl Cohen Zedek Latzer Baratz LLP

(57) ABSTRACT

A method for heating a first exhaust gas purification device and a second exhaust gas purification device of an exhaust system of an internal combustion engine of a motor vehicle, has the following steps: determining a first actual temperature of the first device and a second actual temperature of the second device, determining a first setpoint temperature of the first device and a second setpoint temperature of the second device by means of a heating coordination device, determining a first heat demand of the first device and a second heat demand of the second device, creating a heating specification for the first device and for the second device, relaying the heating specification to an engine control device of the motor vehicle, and controlling the internal combustion engine by means of the engine control device as a function of the heating specification.

10 Claims, 2 Drawing Sheets

(51) Int. Cl.
*F01N 3/035* (2006.01)
*F01N 9/00* (2006.01)
*F02D 41/14* (2006.01)
*F02D 41/26* (2006.01)
*F02D 41/24* (2006.01)

(52) U.S. Cl.
CPC ......... *F01N 9/002* (2013.01); *F02D 41/0245* (2013.01); *F02D 41/1401* (2013.01); *F02D 41/1448* (2013.01); *F01N 2560/08* (2013.01); *F01N 2900/0416* (2013.01); *F01N 2900/1406* (2013.01); *F01N 2900/1602* (2013.01); *F02D 41/2416* (2013.01); *F02D 41/266* (2013.01); *F02D 2041/1418* (2013.01); *F02D 2200/0802* (2013.01); *F02D 2200/0812* (2013.01)

(58) Field of Classification Search
CPC ............ F01N 2560/06; F01N 2560/08; F01N 2900/0416; F01N 2900/1406; F01N 2900/1602; F02D 41/0245; F02D 41/029; F02D 41/1401; F02D 41/1448; F02D 41/2416; F02D 41/266; F02D 2041/1418; F02D 2200/0802; F02D 2200/0812
See application file for complete search history.

(56) References Cited

U.S. PATENT DOCUMENTS

| | | |
|---|---|---|
| 2005/0217256 A1 | 10/2005 | Okugawa et al. |
| 2006/0283178 A1 | 12/2006 | Akagawa |
| 2013/0255235 A1 | 10/2013 | Hodgson et al. |
| 2013/0269427 A1 | 10/2013 | Nagaoka et al. |
| 2014/0311123 A1 | 10/2014 | Gonze et al. |
| 2015/0059318 A1 | 3/2015 | Nakada |
| 2016/0222861 A1 | 8/2016 | Fujie et al. |

FOREIGN PATENT DOCUMENTS

| | | | |
|---|---|---|---|
| CN | 105556082 A | 5/2016 | |
| DE | 101 43 554 A1 | 6/2003 | |
| DE | 10 2009 045 989 A1 | 4/2011 | |
| DE | 10 2010 006 013 A1 | 8/2011 | |
| DE | 10 2014 105 043 A1 | 10/2014 | |
| DE | 10 2014 216 976 A1 | 3/2015 | |
| DE | 10 2016 102 356 A1 | 9/2016 | |
| EP | 1154130 A1 | 11/2001 | |
| FR | 2 811 370 A1 | 1/2002 | |
| FR | 2811370 A1 * | 1/2002 | ........... F02D 41/029 |
| JP | 2005248765 A | 9/2005 | |

OTHER PUBLICATIONS

Search report for European Patent Application No. EP 1 915 9013.2, dated Jul. 22, 2019.
Office Action for Chinese Patent Application No. 201910136911, dated Sep. 28, 2020.

* cited by examiner

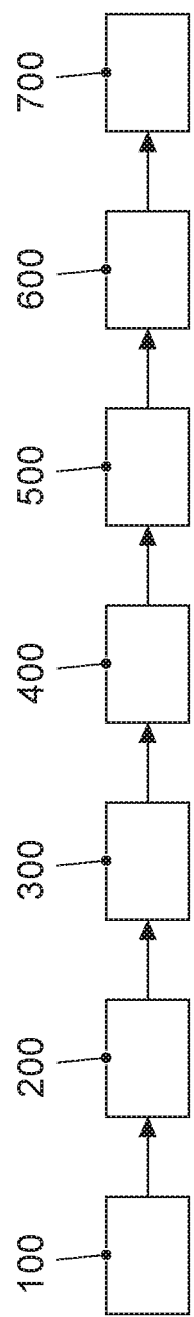

METHOD FOR HEATING EXHAUST GAS PURIFICATION DEVICES, EMISSION CONTROL SYSTEM, AND MOTOR VEHICLE

FIELD OF THE INVENTION

The present invention relates to a method for heating a first exhaust gas purification device and a second exhaust gas purification device of an exhaust system of an internal combustion engine of a motor vehicle. The invention further relates to an emission control system for purifying exhaust gases of an exhaust system of an internal combustion engine of a motor vehicle, and a motor vehicle having an emission control system.

BACKGROUND OF THE INVENTION

Current motor vehicles have at least one exhaust gas purification device for purifying exhaust gases of an exhaust system of an internal combustion engine of a motor vehicle. There are exhaust gas purification devices that have a temperature range in which exhaust gas purification is first possible, or in which the efficiency of the exhaust gas purification is particularly high. Other exhaust gas purification devices generally require a temperature peak in order to combust filtered waste materials, for example. Therefore, there are various situations that make heating or warming of the exhaust gas purification device necessary. The measures to be used for this purpose depend on the instantaneous operating state of the internal combustion engine and the exhaust gas purification device to be heated. Various heating measures, such as heating via torque reserve and heating via lambda split, must be decentrally mapped in software for each exhaust gas purification device and requested by an engine control system of the internal combustion engine, with a high level of coordination effort. However, the same measures may frequently be used for various purposes, and thus reused. Accordingly, synergies are present that are usable for improving the transparency of the software and for minimizing the data volume and the application effort.

Exhaust gas purification devices are known from DE 101 43 554 A1 and DE 10 2009 045 989 A1 that are heatable by means of an electronic heating element. Such exhaust gas purification devices have the disadvantage that the electronic heating elements result in increased power consumption and thus place considerable load on a battery of the motor vehicle.

SUMMARY OF THE INVENTION

The object of the present invention, therefore, is to eliminate or at least partially eliminate the above-described disadvantages in a method for heating a first exhaust gas purification device and a second exhaust gas purification device of an exhaust system of an internal combustion engine of a motor vehicle, an emission control system for purifying exhaust gases of an exhaust system of an internal combustion engine of a motor vehicle, and a motor vehicle having an emission control system. The object of the present invention in particular is to provide a method, an emission control system, and a motor vehicle which, in a simple and cost-effective manner, ensure effective heating of the exhaust gas purification devices and avoid excessive communication with an engine control device of the motor vehicle.

The above object is achieved by the patent claims. Accordingly, the object is achieved by a method for heating a first exhaust gas purification device and a second exhaust gas purification device of an exhaust system of an internal combustion engine of a motor vehicle as claimed, by an emission control system for purifying exhaust gases of an exhaust system of an internal combustion engine of a motor vehicle as claimed, and by a motor vehicle as claimed. Further features and details of the invention result from the subclaims, the description, and the drawings. Of course, features and details that are described in conjunction with the method according to the invention also apply in conjunction with the emission control system according to the invention and the motor vehicle according to the invention and in each case vice versa, so that with regard to the disclosure, mutual reference is or may always be made to the individual aspects of the invention.

According to a first aspect of the invention, the object is achieved by a method for heating a first exhaust gas purification device and a second exhaust gas purification device of an exhaust system of an internal combustion engine of a motor vehicle. The method has the following steps:

determining a first actual temperature of the first exhaust gas purification device by means of a first temperature determination device or a first temperature measuring device, determining a second actual temperature of the second exhaust gas purification device by means of a second temperature determination device or a second temperature measuring device, determining a first setpoint temperature of the first exhaust gas purification device and a second setpoint temperature of the second exhaust gas purification device by means of a heating coordination device, determining a first heat demand of the first exhaust gas purification device and a second heat demand of the second exhaust gas purification device by means of the heating coordination device, creating a heating specification for the first exhaust gas purification device and for the second exhaust gas purification device as a function of the first heat demand of the first exhaust gas purification device and the second heat demand of the second exhaust gas purification device by means of the heating coordination device, relaying the heating specification to an engine control device of the motor vehicle for controlling the internal combustion engine of the motor vehicle by the heating coordination device, and controlling the internal combustion engine by means of the engine control device as a function of the heating specification for heating the first exhaust gas purification device and the second exhaust gas purification device.

The first actual temperature of the first exhaust gas purification device is determined by means of the first temperature determination device or the first temperature measuring device, and the second actual temperature of the second exhaust gas purification device is determined by means of the second temperature determination device or the second temperature measuring device. The determination of the temperature may take place, for example, by calculation by means of an engine control device having the first temperature determination device and/or the second temperature determination device. The measurement of the temperature may take place with or without contact, for example. The particular actual temperature is preferably measured directly at a location at which the temperature is relevant for the operation of the particular exhaust gas purification device. Alternatively, the actual temperature may be measured at some other location, and may be determined or calculated via known heat paths of the particular exhaust gas purification device and its heat conduction properties. The determination of the actual temperatures preferably takes place continuously or at least repeatedly, at defined intervals or with observance of maximum allowable time intervals, in order to determine the most accurate pattern possible of the actual temperatures. For example, the progress in meeting a heating specification may be accurately determined in this way.

The first setpoint temperature of the first exhaust gas purification device and the second setpoint temperature of the second exhaust gas purification device are determined by means of the heating coordination device. The setpoint temperatures may be stored, for example, in a database on a memory unit of the motor vehicle. It may be provided that the setpoint temperatures are predefined as a function of exhaust gas compositions and/or exhaust gas pressures or the like. The setpoint temperature of an exhaust gas purification device designed as a catalytic converter describes, for example, a temperature at which a conversion of $NO_x$ to $NO_2$ is optimized. The setpoint temperature of an exhaust gas purification device designed as a particle filter describes, for example, a temperature at which combustion of filtered particles is optimized for cleaning the particle filter. In this regard, optimization refers to a state that takes into account a functionality of the particular exhaust gas purification device as well as operation of the internal combustion engine as intended.

In addition, the first heat demand of the first exhaust gas purification device and the second heat demand of the second exhaust gas purification device are determined by means of the heating coordination device. The particular heat demand results essentially from a difference between the setpoint temperature and the measured actual temperature. For the case that the actual temperature exceeds the setpoint temperature, there is no heat demand at the particular exhaust gas purification device. Additional heat losses, such as by convection, are preferably also taken into account in the determination or calculation of the heat demand. The heat demand is a measure of how much heat is to be supplied to the particular exhaust gas purification device in order to achieve the setpoint temperature. Performance characteristics of the internal combustion engine for providing exhaust gas heat are preferably likewise taken into account in determining the heat demand in order to determine a heat demand that is also achievable within the scope of the technical capabilities of the internal combustion engine. Within the scope of the invention, the heating specification may be specified based on predetermined performance indicators or characteristic maps that take the heat demand into account, so that the heating specification is derivable directly from the actual temperature.

The heating coordination device subsequently creates a heating specification for the first exhaust gas purification device and for the second exhaust gas purification device. The heating specification is created as a function of the first heat demand of the first exhaust gas purification device and the second heat demand of the second exhaust gas purification device. When performance indicators or characteristic maps are present, the heating specification may also be derived directly therefrom based on the determined actual temperature. The heating specification may be understood as an instruction to the internal combustion engine for the defined provision of exhaust gas heat, and is preferably coordinated with the technical properties of the internal combustion engine, so that the heating specification is within the range of technical feasibility for the internal combustion engine. The heating specification may, for example, define a setpoint temperature or a setpoint temperature curve of the exhaust gas of the internal combustion engine. It may be provided that the heating specification specifies a lower temperature limit, so that exceeding this lower temperature limit by the exhaust gas does not preclude meeting the heating specification.

The heating coordination device subsequently relays the heating specification to the engine control device of the motor vehicle. The engine control device is designed for controlling the internal combustion engine of the motor vehicle. The relaying preferably takes place via a data interface designed for this purpose, in particular via a cable. Alternatively, the heating coordination device and the engine control device may be combined into a single unit, so that the relaying may take place, for example, via a shared printed circuit board or a bus system.

Lastly, the engine control device controls the internal combustion engine as a function of the heating specification for heating the first exhaust gas purification device and the second exhaust gas purification device. In other words, it may be provided according to the invention that the control device already controls the internal combustion engine for driving the motor vehicle. The exhaust gas of the internal combustion engine accordingly has a specific exhaust gas temperature or a specific exhaust gas temperature curve. For the case that the relayed heating specification requires a higher exhaust gas temperature, the engine control device appropriately readjusts the internal combustion engine to achieve higher exhaust gas temperatures.

The method is preferably carried out repeatedly to always ensure that the exhaust gas purification devices operate under optimal operating temperatures, and thus carry out the purification of the exhaust gas in a particularly efficient manner.

A method according to the invention for heating a first exhaust gas purification device and a second exhaust gas purification device of an exhaust system of an internal combustion engine of a motor vehicle has the advantage over conventional methods that optimized operation of the exhaust gas purification devices is ensured in a cost-effective manner, using simple means, so that operation of the engine control device, and thus of the internal combustion engine, is improved by bundling the individual heat demands into a joint heating specification. The engine control system may now control the internal combustion engine to a specific heating specification of the heating coordination device, and no longer has to differentiate between a plurality of individual heating specifications of different exhaust gas purification devices. In addition, the generation of a joint heating specification by the heating coordination device has the advantage that the heating specification takes into account the heat demands of all exhaust gas purification devices as well as the technical features of the internal combustion engine.

According to one preferred refinement of the invention, in a method it may be provided that the heating specification is created by means of the heating coordination device, taking into account a first pressure that is measured at the first exhaust gas purification device by means of a first pressure measuring device, and/or a second pressure that is measured at the second exhaust gas purification device by means of a second pressure measuring device. In addition to the temperature, the pressure is a parameter via which the functioning of exhaust gas purification devices may be influenced. A pressure difference at a particle filter that exceeds a threshold value may indicate, for example, the need to burn off residues in the particle filter. Thus, by determining the pressure and temperature, a more accurate determination of the heat demand is advantageously possible, using simple means.

According to the invention, it is preferred that in creating the heating specification, a heating strategy is selected from a list of predefined heating strategies by means of the heating coordination device, based on the first heat demand and the second heat demand. Within the scope of the invention, a heating strategy is a sequential or temporal process of providing heat for meeting the heating specification. To heat a component from an actual temperature to a higher setpoint temperature, in principle many different heating strategies are possible, for example by slow heating at moderate exhaust gas temperatures, or rapid heating at higher exhaust gas temperatures. By use of the heating coordination device, a heating strategy is preferably selected from the list that preferably meets the heat demands of all of the exhaust gas purification devices, in particular taking into account synergy effects or the like. The individual heating strategies are stored in tabular or graphical form, for example. In tabular form, exhaust gas temperatures are preferably associated [with] quantities of heating energy. A list of the heating strategies preferably contains a plurality of heating strategies, so that the heating coordination device may select the optimal heating strategy for a specific case. The heating strategies and the list of heating strategies are preferably stored on a memory unit of the motor vehicle. The memory unit is preferably designed as part of the engine control system or the heating coordination device.

More preferably, the selected heating strategy is modified to the first heat demand and/or the second heat demand by means of the heating coordination device. A heating strategy is preferably selected that best covers the first heat demand and the second heat demand. The situation may arise that, although a selected heating strategy is the most meaningful or best heating strategy from the list of available heating strategies, it is not optimal for covering the first heat demand and/or the second heat demand. In this case it is advantageous to modify the selected heating strategy in such a way that it is better matched to the first heat demand and/or the second heat demand. This may take place by interpolation, for example.

In one particularly preferred embodiment of the method according to the invention, the heating coordination device carries out a prioritization between the first heat demand and the second heat demand when creating the heating specification. This may be advantageous in particular when there is a discrepancy between the first heat demand and the second heat demand, and reaching a setpoint temperature of a certain exhaust gas purification device is of particular importance. Likewise, technical limitations of the internal combustion engine may thus be taken into account. By prioritizing the heat demands, exhaust gas purification of the exhaust gases of the internal combustion engine may be optimized in a cost-effective manner, using simple means.

The heating coordination device preferably creates the heating specification in such a way that the first heat demand and the second heat demand are completely covered. Optimal operation of the exhaust gas purification devices is ensured when the heat demand is completely covered. Therefore, the creation of the heating specification should always have the aim of covering the heat demands as completely as possible, within the scope of technical feasibility and economic reasonableness, in order to optimize the operation of the exhaust gas purification devices.

According to the invention, it is particularly preferred that the first exhaust gas purification device is a catalytic converter and the second exhaust gas purification device is a particle filter. The catalytic converter is preferably designed for converting nitrogen oxides and/or hydrocarbons and/or carbon monoxide to nontoxic substances such as carbon dioxide, water, and nitrogen. A setpoint temperature of the catalytic converter may be approximately 500° C., for example. The particle filter is designed as a diesel soot particle filter, for example. During regeneration of the particle filter, the soot particles that have collected in the particle filter are combusted, and thus converted to carbon dioxide. A setpoint temperature of the particle filter for the regeneration may be between 500° C. and 550° C., for example.

According to a second aspect of the invention, the object is achieved by an emission control system for purifying exhaust gases of an exhaust system of an internal combustion engine of a motor vehicle. The emission control system has a first exhaust gas purification device for purifying the exhaust gases, a second exhaust gas purification device for purifying the exhaust gases, a first temperature determination device or a first temperature measuring device for determining a first actual temperature of the first exhaust gas purification device, and a second temperature determination device or a second temperature measuring device for determining a second actual temperature of the second exhaust gas purification device. According to the invention, the emission control system has a heating coordination device. The heating coordination device is designed for determining a first setpoint temperature of the first exhaust gas purification device and a second setpoint temperature of the second exhaust gas purification device, for determining a first heat demand of the first exhaust gas purification device and a second heat demand of the second exhaust gas purification device, for creating a heating specification for the first exhaust gas purification device and for the second exhaust gas purification device as a function of the first heat demand of the first exhaust gas purification device and of the second heat demand of the second exhaust gas purification device, and for relaying the heating specification to an engine control device for controlling the internal combustion engine of the motor vehicle.

The first temperature determination device and the first temperature measuring device are designed for determining the first actual temperature of the first exhaust gas purification device. The second temperature determination device and the second temperature measuring device are designed for determining the second actual temperature of the second exhaust gas purification device. The first temperature determination device and the second temperature determination device are preferably designed for receiving the actual temperatures from another unit, such as the engine control device. The first temperature measuring device and the second temperature measuring device are preferably designed for determining the temperature, with or without contact. Moreover, the first temperature measuring device and the second temperature measuring device are preferably designed and arranged for measuring the particular actual temperature directly at a location at which the temperature is relevant for the operation of the particular exhaust gas purification device. Alternatively, within the scope of the invention it may be provided that the first temperature measuring device and the second temperature measuring device are designed for measuring the particular actual temperature at some other location.

The heating coordination device is preferably designed for determining or calculating the actual temperature via known heat paths of the particular exhaust gas purification device and its heat conduction properties, based on the temperature that is measured at another location. The determination may also take place by receiving the data from a data source. In addition, the heating coordination device is designed for determining the first setpoint temperature of the first exhaust gas purification device and the second setpoint temperature of the second exhaust gas purification device. For this purpose, the emission control system preferably has a memory device in which the setpoint temperatures of the exhaust gas purification devices are stored. Furthermore, the heating coordination device is designed for determining the first heat demand of the first exhaust gas purification device and the second heat demand of the second exhaust gas purification device. The particular heat demand results essentially from a difference between the setpoint temperature and the measured actual temperature. In addition, the heating coordination device is designed for creating the heating specification for the first exhaust gas purification device and for the second exhaust gas purification device, in particular as a function of the first heat demand of the first exhaust gas purification device and of the second heat demand of the second exhaust gas purification device. Lastly, the heating coordination device is designed for relaying the heating specification to the engine control device of the internal combustion engine. For this purpose, the emission control system preferably has a suitable data interface for connection to the engine control device.

The engine control device is designed for controlling the internal combustion engine. In addition, the engine control device is designed for controlling the internal combustion engine as a function of the heating specification for heating the first exhaust gas purification device and the second exhaust gas purification device. Due to this control of the internal combustion engine, exhaust gas temperatures are controllable in a targeted manner, and the first exhaust gas purification device and the second exhaust gas purification device are thus heatable according to the heating specification.

All previously described advantages concerning a method for heating a first exhaust gas purification device and a second exhaust gas purification device of an exhaust system of an internal combustion engine of a motor vehicle that have been described according to the first aspect of the invention also result for the described emission control system for purifying exhaust gases of an exhaust system of an internal combustion engine of a motor vehicle. Accordingly, the emission control system according to the invention has the advantage over conventional emission control systems that optimized operation of the exhaust gas purification devices is ensured in a cost-effective manner, using simple means, so that operation of the engine control device, and thus of the internal combustion engine, may be improved by bundling the individual heat demands into a joint heating specification. The engine control system may now control the internal combustion engine to a specific heating specification of the heating coordination device, and no longer has to differentiate between a plurality of individual heating specifications of different exhaust gas purification devices. In addition, the generation of a joint heating specification by the heating coordination device has the advantage that the heating specification takes into account the heat demands of all exhaust gas purification devices as well as the technical features of the internal combustion engine.

The first exhaust gas purification device is preferably designed as a catalytic converter, and the second exhaust gas purification device is preferably designed as a particle filter. The catalytic converter is preferably designed for converting nitrogen oxides and/or hydrocarbons and/or carbon monoxide to nontoxic substances such as carbon dioxide, water, and nitrogen. A setpoint temperature of the catalytic converter may be approximately 500° C., for example. The particle filter is designed as a gasoline engine soot particle filter, for example. During regeneration of the particle filter, the soot particles that have collected in the particle filter are combusted, and thus converted to carbon dioxide. A setpoint temperature of the particle filter for the regeneration may be above 550° C., for example. An emission control system having such exhaust gas purification devices has the advantage that critical pollutants may be filtered from the exhaust gas of the internal combustion engine.

According to a third aspect of the invention, the object is achieved by a motor vehicle. The motor vehicle has an internal combustion engine and an exhaust system that is situated at the internal combustion engine. In addition, the motor vehicle has an engine control device for controlling the internal combustion engine. According to the invention, the motor vehicle has an emission control system according to the invention which is arranged at the exhaust system. The emission control system is situated at the exhaust system of the motor vehicle in such a way that exhaust gases of the internal combustion engine may be purified by the first exhaust gas purification device and the second exhaust gas purification device of the emission control system. Within the scope of the invention, an arrangement at the exhaust system means, for example, that the emission control system is designed as part of the exhaust system. Some components of the emission control system, in particular the first exhaust gas purification device, the second exhaust gas purification device, and optionally the temperature measuring devices and/or pressure measuring devices, are preferably situated in the exhaust gas stream. Other components of the emission control system, such as the heating coordination device and a memory device for storing the heating strategies and/or setpoint temperatures, are preferably situated outside the exhaust gas stream.

All previously described advantages concerning a method for heating a first exhaust gas purification device and a second exhaust gas purification device of an exhaust system of an internal combustion engine of a motor vehicle that have been described according to the first aspect of the invention also result for the described motor vehicle. Accordingly, the motor vehicle according to the invention has the advantage over conventional motor vehicles that optimized operation of the exhaust gas purification devices is ensured in a cost-effective manner, using simple means, so that operation of the engine control device, and thus of the internal combustion engine, may be improved by bundling the individual heat demands into a joint heating specification. The engine control system may now control the internal combustion engine to a specific heating specification of the heating coordination device, and no longer has to differentiate between a plurality of individual heating specifications of different exhaust gas purification devices. In addition, the generation of a joint heating specification by the heating coordination device has the advantage that the heating specification takes into account the heat demands of all exhaust gas purification devices as well as the technical features of the internal combustion engine.

BRIEF DESCRIPTION OF THE DRAWINGS

A method according to the invention for heating a first exhaust gas purification device and a second exhaust gas purification device of an exhaust system of an internal combustion engine of a motor vehicle, an emission control system according to the invention for purifying exhaust gases of an exhaust system of an internal combustion engine of a motor vehicle, and a motor vehicle according to the invention are explained in greater detail below with reference to the drawings, which schematically show the following:

FIG. 3 shows a flow chart of one preferred embodiment of a method according to the invention.

DETAILED DESCRIPTION OF THE INVENTION

Figure 1:
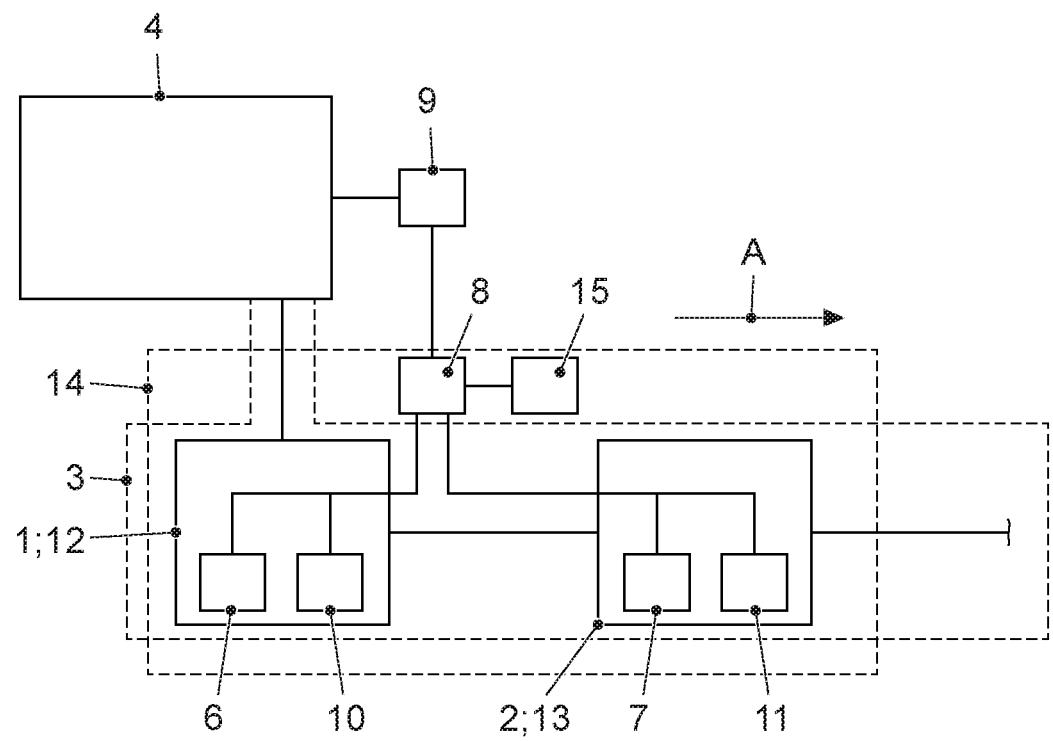
FIG. 1 shows a side view of one preferred embodiment of an emission control system according to the invention.
Figure 2:
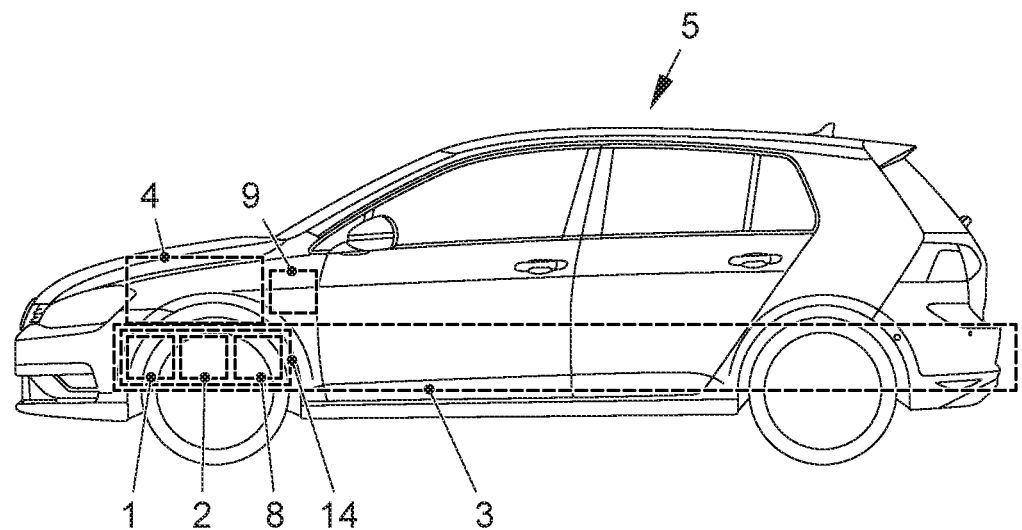
FIG. 2 shows a side view of one preferred embodiment of a motor vehicle according to the invention.

Elements having identical functions and operating principles are provided with the same reference numerals in each of FIGS. 1 through 3.

FIG. 1 schematically shows one preferred embodiment of an emission control system 14 according to the invention in a side view. The emission control system 14 is situated at an exhaust system 3 of an internal combustion engine 4. A first exhaust gas purification device 1 of the emission control system 14 is situated upstream from a second exhaust gas purification device 2 of the emission control system 14 in the discharge direction A of the exhaust system 3. The first exhaust gas purification device 1 is designed as a catalytic converter 12, and optionally has a first temperature measuring device 6 for measuring a first actual temperature of the first exhaust gas purification device 1, and an optional first pressure measuring device 10 for measuring a first actual pressure of the first exhaust gas purification device 1. The second exhaust gas purification device 2 is designed as a particle filter 13, and optionally has a second temperature measuring device 7 for measuring a second actual temperature of the second exhaust gas purification device 2, and an optional second pressure measuring device 11 for measuring a second actual pressure of the second exhaust gas purification device 2.

In addition, the emission control system 14 has a heating coordination device 8. The heating coordination device 8 is designed for determining a first setpoint temperature of the first exhaust gas purification device 1 and for determining a second setpoint temperature of the second exhaust gas purification device 2. For determining the setpoint temperatures, the heating coordination device 8 is coupled to a memory device 15 of the emission control system 14. Furthermore, the heating coordination device 8 is designed for determining a first heat demand of the first exhaust gas purification device 1 as a function of the determined first actual temperature and of the first setpoint temperature, and for determining a second heat demand of the second exhaust gas purification device 2 as a function of the determined second actual temperature and of the second setpoint temperature. Lastly, the heating coordination device 8 is designed for creating a heating specification for the first exhaust gas purification device 1 and for the second exhaust gas purification device 2 as a function of the first heat demand of the first exhaust gas purification device 1 and of the second heat demand of the second exhaust gas purification device 2, and for relaying the heating specification to an engine control device 9 for controlling the internal combustion engine 4.

FIG. 2 schematically shows one preferred embodiment of a motor vehicle 5 according to the invention in a side view. The motor vehicle 5 has an internal combustion engine 4 with an engine control device 9 for controlling the internal combustion engine 4. The motor vehicle 5 has an exhaust system 3 for discharging the exhaust gases of the internal combustion engine 4. An emission control system 14 according to the invention, having a first exhaust gas purification device 1 and a second exhaust gas purification device 2 for purifying the exhaust gas of the internal combustion engine 4, is situated at the exhaust system 3. The emission control system 14 has a heating coordination device 8 for creating the heating specification and relaying it to the engine control device 9.

FIG. 3 schematically illustrates one preferred embodiment of a method according to the invention in a flow chart. The first actual temperature of the first exhaust gas purification device 1 is determined in a first method step 100 by means of the first temperature measuring device 6. The second actual temperature of the second exhaust gas purification device 2 is determined in a second method step 200 by means of the second temperature measuring device 7. The first setpoint temperature of the first exhaust gas purification device 1 and the second setpoint temperature of the second exhaust gas purification device 2 are determined in a third method step 300 by means of the heating coordination device 8. The first heat demand of the first exhaust gas purification device 1 and the second heat demand of the second exhaust gas purification device 2 are determined in a fourth method step 400 by means of the heating coordination device 8. The heating specification for the first exhaust gas purification device 1 and for the second exhaust gas purification device 2 are created as a function of the first heat demand of the first exhaust gas purification device 1 and of the second heat demand of the second exhaust gas purification device 2 in a fifth method step 500 by means of the heating coordination device 8. The heating specification is transmitted to the engine control device 9 of the motor vehicle 5 for controlling the internal combustion engine 4 of the motor vehicle 5 in a sixth method step 600 by means of the heating coordination device 8. The internal combustion engine 4 is controlled as a function of the heating specification for heating the first exhaust gas purification device 1 and the second exhaust gas purification device 2 in a seventh method step 700 by means of the engine control device 9.

LIST OF REFERENCE NUMERALS 1 first exhaust gas purification device
2 second exhaust gas purification device
3 exhaust system
4 internal combustion engine
5 motor vehicle
6 first temperature measuring device
7 second temperature measuring device
8 heating coordination device
9 engine control device
10 first pressure measuring device
11 second pressure measuring device
12 catalytic converter
13 particle filter
14 emission control system
15 memory device
100 first method step 200 second method step
300 third method step
400 fourth method step
500 fifth method step
600 sixth method step
700 seventh method step
A discharge direction

The invention claimed is:

1. A method for heating a first exhaust gas purification device and a second exhaust gas purification device of an exhaust system of an internal combustion engine of a motor vehicle, having the following steps:
    measuring a first actual temperature of the first exhaust gas purification device by contact measurement by a first temperature measuring device of the first exhaust gas purification device,
    measuring a second actual temperature of the second exhaust gas purification device by contact measurement by a second temperature measuring device of the second exhaust gas purification device,
    determining a first setpoint temperature of the first exhaust gas purification device and a second setpoint temperature of the second exhaust gas purification device by means of a heating coordination device,
    calculating a first heat demand of the first exhaust gas purification device and a second heat demand of the second exhaust gas purification device by means of the heating coordination device taking into account additional heat losses and/or performance characteristics of the internal combustion engine,
    creating a heating specification for the first exhaust gas purification device and for the second exhaust gas purification device as a function of the first heat demand of the first exhaust gas purification device and the second heat demand of the second exhaust gas purification device by means of the heating coordination device, wherein the heating specification defines a setpoint temperature or a setpoint temperature curve of the exhaust gas of the internal combustion engine,
    relaying the heating specification to an engine control device of the motor vehicle for controlling the internal combustion engine of the motor vehicle by means of the heating coordination device, and
    controlling the internal combustion engine by means of the engine control device as a function of the heating specification for heating the first exhaust gas purification device and the second exhaust gas purification device,
    wherein the steps of determining the temperature of the first and second exhaust gas purification devices comprise measuring the respective temperature directly at a location at which the temperature is relevant for the operation of the particular exhaust gas purification device.

2. The method according to claim 1, wherein the heating specification is created by means of the heating coordination device, taking into account a first pressure that is measured at the first exhaust gas purification device by means of a first pressure measuring device, and/or a second pressure that is measured at the second exhaust gas purification device by means of a second pressure measuring device.

3. The method according to claim 1, wherein, in creating the heating specification, a heating strategy is selected from a list of predefined heating strategies by means of the heating coordination device, based on the first heat demand and the second heat demand.

4. The method according to claim 3, wherein the selected heating strategy is modified to the first heat demand and/or the second heat demand by means of the heating coordination device.

5. The method according to claim 1, wherein the heating coordination device carries out a prioritization between the first heat demand and the second heat demand when creating the heating specification.

6. The method according to claim 1, wherein the heating coordination device creates the heating specification in such a way that the first heat demand and the second heat demand are completely covered.

7. The method according to claim 1, wherein the first exhaust gas purification device is a catalytic converter and the second exhaust gas purification device is a particle filter.

8. An emission control system for purifying exhaust gases of an exhaust system of an internal combustion engine of a motor vehicle, comprising:
    a first exhaust gas purification device for purifying the exhaust gases,
    a second exhaust gas purification device for purifying the exhaust gases,
    a first temperature measuring device configured for contact measurement of the first exhaust gas purification device for measuring a first actual temperature of the first exhaust gas purification device,
    a second temperature measuring device configured for contact measurement of the second exhaust gas purification device for measuring a second actual temperature of the second exhaust gas purification device, and
    a heating coordination device
        for determining a first setpoint temperature of the first exhaust gas purification device and a second setpoint temperature of the second exhaust gas purification device,
        for calculating a first heat demand of the first exhaust gas purification device and a second heat demand of the second exhaust gas purification device, taking into account additional heat losses and/or performance characteristics of the internal combustion engine,
        for creating a heating specification for the first exhaust gas purification device and for the second exhaust gas purification device as a function of the first heat demand of the first exhaust gas purification device and of the second heat demand of the second exhaust gas purification device, wherein the heating specification defines a setpoint temperature or a setpoint temperature curve of the exhaust gas of the internal combustion engine, and
        for relaying the heating specification to an engine control device for controlling the internal combustion engine of the motor vehicle,
    wherein the first and second temperature measuring devices measure the respective temperature directly at a location at which the temperature is relevant for the operation of the particular exhaust gas purification device.

9. The emission control system according to claim 8, wherein the first exhaust gas purification device is designed as a catalytic converter and the second exhaust gas purification device is designed as a particle filter.

10. A motor vehicle, comprising:
    an internal combustion engine,
    an exhaust system that is situated at the internal combustion engine, an engine control device for controlling the internal combustion engine, and an emission control system according to claim 8 which is situated at the exhaust system.

* * * * *